US008097681B2

(12) United States Patent
Pellegatti et al.

(10) Patent No.: US 8,097,681 B2
(45) Date of Patent: *Jan. 17, 2012

(54) 1-BUTENE PROPYLENE COPOLYMER COMPOSITIONS

(75) Inventors: Giampaolo Pellegatti, Ferrara (IT); Daniele Bigiavi, Bologna (IT); Rita Martelli, Ferrara (IT); Maria Silvia Tonti, Ferrara (IT); Luigi Resconi, Ferrara (IT); Simona Guidotti, Bologna (IT)

(73) Assignee: Basell Polyolefine GmbH, Wesseling (DE)

( * ) Notice: Subject to any disclaimer, the term of this patent is extended or adjusted under 35 U.S.C. 154(b) by 24 days.

This patent is subject to a terminal disclaimer.

(21) Appl. No.: 12/310,508

(22) PCT Filed: Aug. 22, 2007

(86) PCT No.: PCT/EP2007/058730
§ 371 (c)(1),
(2), (4) Date: Jan. 11, 2010

(87) PCT Pub. No.: WO2008/025710
PCT Pub. Date: Mar. 6, 2008

(65) Prior Publication Data
US 2010/0121011 A1 May 13, 2010

Related U.S. Application Data

(60) Provisional application No. 60/841,706, filed on Sep. 1, 2006.

(30) Foreign Application Priority Data
Aug. 30, 2006 (EP) .................... 06119810

(51) Int. Cl.
C08L 23/20 (2006.01)
C08F 210/08 (2006.01)
(52) U.S. Cl. ........ 525/232; 525/240; 526/113; 526/114; 526/160; 526/161; 526/165; 526/348.6; 526/943; 502/113; 502/152; 502/155
(58) Field of Classification Search .................. 526/113, 526/114, 160, 161, 165, 943, 348.6; 502/113, 502/152, 155; 525/232, 240
See application file for complete search history.

(56) References Cited

U.S. PATENT DOCUMENTS

| 4,298,722 | A | 11/1981 | Collette et al. |
| 6,288,192 | B1 | 9/2001 | Fujita et al. |
| 6,444,833 | B1 | 9/2002 | Ewen et al. |
| 6,559,252 | B1 | 5/2003 | Horton et al. |
| 6,608,224 | B2 | 8/2003 | Resconi et al. |
| 6,635,779 | B1 | 10/2003 | Ewen et al. |
| 6,841,501 | B2 | 1/2005 | Resconi et al. |
| 6,878,786 | B2 | 4/2005 | Resconi et al. |
| 6,930,190 | B2 | 8/2005 | Nifant'ev et al. |
| 6,953,829 | B2 | 10/2005 | Kratzer et al. |
| 7,074,864 | B2 | 7/2006 | Resconi |
| 7,101,940 | B2 | 9/2006 | Schottek et al. |
| 7,141,527 | B1 | 11/2006 | Van Baar et al. |
| 7,141,637 | B2 | 11/2006 | Elder et al. |
| 7,163,907 | B1 | 1/2007 | Canich et al. |
| 7,390,862 | B2 | 6/2008 | Resconi |
| 7,459,511 | B2 | 12/2008 | Resconi |
| 7,476,717 | B2 | 1/2009 | Resconi |
| 7,531,609 | B2 * | 5/2009 | Resconi et al. ............... 526/161 |
| 7,579,423 | B2 | 8/2009 | Resconi |
| 2006/0252637 | A1 | 11/2006 | Okumura |
| 2008/0027190 | A1 | 1/2008 | Tonti et al. |
| 2008/0139761 | A1 | 6/2008 | Resconi |
| 2008/0171840 | A1 | 7/2008 | Resconi |
| 2008/0275254 | A1 | 11/2008 | Resconi |
| 2009/0005523 | A1 | 1/2009 | Resconi et al. |

FOREIGN PATENT DOCUMENTS

| DE | 19962814 | 6/2001 |
| DE | 19962910 | 7/2001 |
| EP | 604908 | 7/1994 |
| EP | 1219645 | 7/2002 |
| EP | 1308466 | 5/2003 |
| WO | 91/02012 | 2/1991 |
| WO | 92/00333 | 1/1992 |
| WO | 99/21899 | 5/1999 |

(Continued)

OTHER PUBLICATIONS

V. Holland et al., "Isotactic Polybutene-1 Single Crystals: Morphology," *Journal of Applied Physics*, vol. 35(11), p. 3241-3248 (1964).
B. Lotz et al., "Chirality Constraints in Crystal-Crystal Transformations: Isotactic Poly(1-butene) versus Syndiotactic Polypropylene," *Macromolecules*, vol. 31(26), p. 9253-9257 (1998).
L. Resconi et al., "1-Olefin Polymerization at Bis(pentamethylcyclopentadienyl)zirconium and-hafnium Centers: Enantioface Selectivity," *Macromolecules*, vol. 25(25), p. 6814-6817 (1992).

(Continued)

*Primary Examiner* — Caixia Lu
(74) *Attorney, Agent, or Firm* — Dilworth IP, LLC

(57) ABSTRACT

A 1-butene/propylene copolymer composition having a content of propylene derived units from 1 to 4% by weight, wherein at least 50% of the crystalline polymer is present in the thermodynamically stable, trigonal Form I (detected by DSC analysis) after 100 hours of the first melting at room temperature comprising:
  b) from 5% by weight to 95% by weight of an atactic 1-butene propylene copolymer having the following features:
    i) distribution of molecular weight Mw/Mn equal to or lower than 4;
    ii) no enthalpy of fusion detectable at a differential scanning calorimeter (DSC); and
    iii) infrared crystallinity lower than 0.5%;
  b) from 5% by weight to 95% by weight of an isotactic 1-butene propylene copolymer having the following features:
    i) isotactic pentads (mmmm) measured by $^{13}$C-NMR, higher than 80%;
    ii) melting point (Tm(II)) higher than 70° C.; and
    iii) distribution of molecular weight Mw/Mn equal to or lower than 4.

11 Claims, 1 Drawing Sheet

FOREIGN PATENT DOCUMENTS

Figure 1:
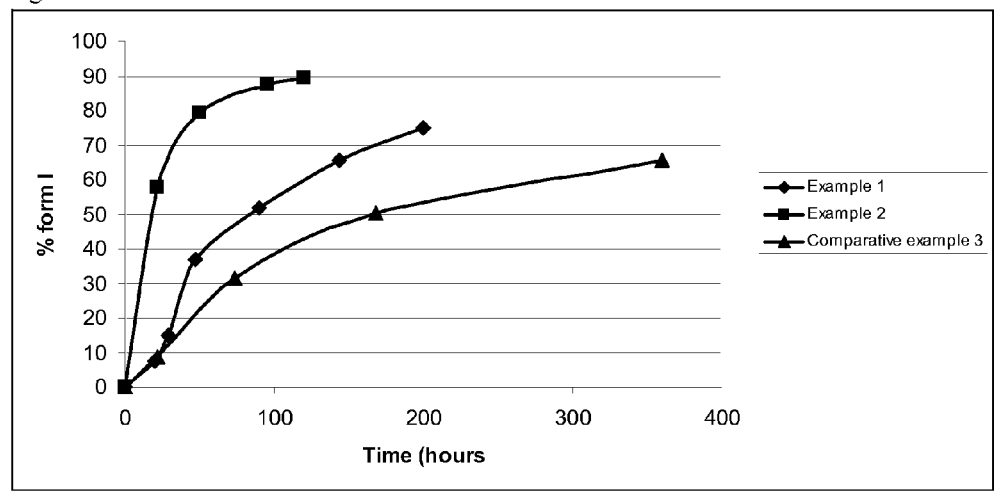

| | | |
|---|---|---|
| WO | 01/21674 | 3/2001 |
| WO | 01/44318 | 6/2001 |
| WO | 01/62764 | 8/2001 |
| WO | 02/100908 | 12/2002 |
| WO | 02/100909 | 12/2002 |
| WO | 03/014107 | 2/2003 |
| WO | 03/045964 | 6/2003 |
| WO | 2004/099269 | 11/2004 |
| WO | 2004/106351 | 12/2004 |
| WO | 2005/105865 | 11/2005 |
| WO | 2006/008211 | 1/2006 |
| WO | 2008/025721 | 3/2008 |

OTHER PUBLICATIONS

H. Cheng, "$^{13}$C NMR Analysis of Propylene-Butylene Copolymers by a Reaction Probability Model," *Journal of Polymer Science: Polymer Physics Edition*, vol. 21, p. 573-581 (1983).

A. Nishioka et al., "Crystallinity and Stereoregularity of Polybutene-1," *Chem. of High Polymers* (Japan), vol. 19, p. 667-671 (1962).

* cited by examiner

1-BUTENE PROPYLENE COPOLYMER COMPOSITIONS

The present invention relates to a 1-butene/propylene-based copolymer composition obtained by using a metallocene-base catalyst system. Said copolymer being characterized by having an atactic and amorphous fraction and an isotactic fraction.

1-Butene polymers are well known in the art. In view of their good properties in terms of pressure resistance, creep resistance, and impact strength, they are widely used for example in the manufacture of pipes for metal pipe replacement, easy-open packaging and films.

Isotactic 1-butene based polymers produced by using metallocene-based catalyst system are well known in the art, processes for obtaining them are described for example in WO 02/100908, WO 02/100909 and WO 03/014107, however the polymers obtainable are endowed with a very high isotacticity.

From the other side atactic 1-butene polymers are known in the art, it is a sticky polymer mainly used as components for adhesive compositions. Examples of processes for producing this polymers are given in U.S. Pat. No. 6,288,192; EP 604 908 and EP 04101912.6.

For certain applications there is the need for a material softer than the isotactic 1-butene polymer, having elastomeric properties, but this material has to be easily processable and above all not sticky as the atactic 1-butene polymers are.

A fractionable elastomeric 1-butene polymers is described in U.S. Pat. No. 4,298,722. This polymer is obtained by using organozirconium compounds such as tetraneophylzirconium, i.e. compounds in which the metal do not have n-bond as metallocene compounds have. The obtained 1-butene polymer can be fractionated with diethyl ether and the ether soluble fractions among other features has an infrared crystallinity value comprised between 1% to 15%. This value is quite high if compared with the infrared crystallinity soluble fraction of the 1-butene polymers of the present invention.

When 1-butene-based polymer are produced they usually crystallize from its solution in the tetragonal form II which then spontaneously transforms into the thermodynamically stable, trigonal form I, as reported in J. Appl. Phys. 1964, 35, 3241 and Macromolecules 1998, 31, 9253. Complete transformation at room temperature requires several days, and usually does not proceed to completion. The most important difference between the two forms is in the melting point that in form I is higher than form II. These two forms can be evidenced by a DSC thermogram. In fact, in the thermogram two main peaks can be evidenced representing the melting enthalpy of the form I (the form melting at higher temperature) and form II (the form melting at lower temperature). By aging the sample it can be noted that the peak representing the form II decreases and the peak representing form I appears or increases, while the total enthalpy represented by the sum of the areas of the two peaks remains substantially constant. It has to be noted that the peak representing form I is not always present at low aging of the sample, but after a certain amount of time it appears in the thermogram. Otherwise the two peaks can be present also at time 0 of the thermogram. Thus it would be desirable to have a material that is converted in form I in the shorter time possible, so that to avoid long storage time before to have the material having the final properties.

An object of the present invention is therefore a 1-butene/propylene copolymer composition having a content of propylene derived units from 1 to 4.0% by weight, more preferably from 1% by weight to 3.5% by weight, even more preferably from 3.0% by weight to 3.5% by weight, wherein at least 50% of the crystalline polymer is present in the thermodynamically stable, trigonal Form I (detected by DSC analysis) after 100 hours of the first melting at room temperature comprising:

a) from 5% by weight to 95% by weight of an atactic and amorphous 1-butene/propylene copolymer having the following features:
   i) distribution of molecular weight Mw/Mn equal to or lower than 4;
   ii) rr triads, measured by $^{13}$C-NMR comprised between 10% and 40%;
   iii) no enthalpy of fusion detectable at a differential scanning calorimeter (DSC); and
   iv) infrared crystallinity lower than 0.5%;
b) from 5% by weight to 95% by weight of an isotactic crystalline 1-butene propylene copolymer having the following features:
   i) isotactic pentads (mmmm) measured by $^{13}$C-NMR, higher than 80%;
   ii) melting point (Tm(II) form II) higher than 70° C.; and
   iii) distribution of molecular weight Mw/Mn equal to or lower than 4.

Preferably in the atactic 1-butene-based polymer component a) of the composition the distribution of molecular weight is lower than 3; more preferably it is lower than 2.5.

In the component a) the rr triads, measured by $^{13}$C-NMR are preferably comprised between 15% and 35%; more preferably rr are comprised between 20% and 30%.

In the component a) the intrinsic viscosity (IV) measured in tetrahydronaphtalene (THN) at 135° C. is preferably comprised between 1.0 dl/g and 5.0 dl/g; preferably between 1.0 dl/g and 3.0 dl/g; more preferably between 1.0 dl/g and 2.5 dl/g.

In the component a) the infrared crystallinity is preferably lower than 0.3%; more preferably lower than 0.1%; even more preferably lower than 0.05%.

Preferably, in the atactic amorphous copolymer of 1-butene component a), the content of propylene derived units is comprised between 1% by weight and 4% by weight, even more preferably it is comprised between 3% by weight and 4% by weight.

Component a) is completely soluble in xylene at 0° C. wherein the solubility is measured according to the procedure described below.

Component a) is an atactic and amorphous 1-butene/propylene copolymer therefore it does not have a melting point and consequently the crystalline polymer b) is the only part detectable at the DSC analysis.

The 1-butene propylene copolymer composition of the present invention is endowed with a particular fast transition between form II and form I. The transition is measured by DSC analysis. A typical thermogram presents two main peaks, representing the Form I (higher melting point) and Form II (lower melting point). Sometimes at lower times only the peak of form II is present, then the peak of form I appears at higher time of aging. The areas of these peaks are directly proportional to the amount of crystalline polymer presented in Form I and Form II. Thus the ratio of the areas (that are also directly proportional to the enthalpy of fusion of each form) is directly proportional to the amount of crystalline polymer in Form I or Form II present in the polymer. Thus with the first DSC thermogram the polymer is melted and the ratio Form I Form II is measured by measuring the enthalpy of fusion. Then after 100 hours at room temperature the enthalpy of fusion is measured again, so that to measure the transformation between Form II and Form I by measuring the areas of the peaks referring to the enthalpy of fusion of these forms.

As said above the polymer object of the present invention is endowed with a particular fast transformation between Form II and Form I. This fast transformation has the advantage to reduce considerably the annealing of the resin. This effect is enhanced by the particular composition of the resin (atactic and isotactic polymers). The transition can be measured by DSC as described below. Preferably in the 1-butene/propylene copolymer composition object of the present invention at least 50% of the crystalline polymer is present in form I after 75 hours annealing at room temperature; even more preferably at least 70% of the crystalline polymer is present in form I after 200 hours.

The atactic amorphous 1-butene copolymers used as component a) can preferably be obtained by polymerizing 1-butene and propylene in the presence of a single-site based catalyst system. Preferably the atactic amorphous 1-butene propylene copolymers, component a) is obtainable with a process comprising the step of polymerizing 1-butene and propylene, in the presence of a catalyst system obtainable by contacting:

a) at least one metallocene compound of formula (Ia) in its meso or meso-like form

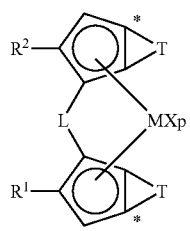

wherein

M is an atom of a transition metal selected from those belonging to group 3, 4, 5, 6 or to the lanthanide or actinide groups in the Periodic Table of the Elements; preferably M is titanium, zirconium or hafnium;

p is an integer from 0 to 3, preferably p is 2, being equal to the formal oxidation state of the metal M minus 2;

X, same or different, is a hydrogen atom, a halogen atom, or a R, OR, $OSO_2CF_3$, OCOR, SR, $NR_2$ or $PR_2$ group, wherein R is a linear or branched, cyclic or acyclic, $C_1$-$C_{40}$-alkyl, $C_2$-$C_{40}$ alkenyl, $C_2$-$C_{40}$ alkynyl, $C_6$-$C_{40}$-aryl, $C_7$-$C_{40}$-alkylaryl or $C_7$-$C_{40}$-arylalkyl radicals; optionally containing heteroatoms belonging to groups 13-17 of the Periodic Table of the Elements; preferably R is a linear or branched $C_1$-$C_{20}$-alkyl radical; or two X can optionally form a substituted or unsubstituted butadienyl radical or a OR'O group wherein R' is a divalent radical selected from $C_1$-$C_{40}$ alkylidene, $C_6$-$C_{40}$ arylidene, $C_7$-$C_{40}$ alkylarylidene and $C_7$-$C_{40}$ arylalkylidene radicals; preferably X is a hydrogen atom, a halogen atom or a R group; more preferably X is chlorine or a $C_1$-$C_{10}$-alkyl radical; such as methyl, or benzyl radicals;

L is a divalent $C_1$-$C_{40}$ hydrocarbon radical optionally containing heteroatoms belonging to groups 13-17 of the Periodic Table of the Elements or a divalent silylene radical containing up to 5 silicon atom; preferably L is a divalent bridging group selected from $C_1$-$C_{40}$ alkylidene, $C_3$-$C_{40}$ cycloalkylidene, $C_6$-$C_{40}$ arylidene, $C_7$-$C_{40}$ alkylarylidene, or $C_7$-$C_{40}$ arylalkylidene radicals optionally containing heteroatoms belonging to groups 13-17 of the Periodic Table of the Elements, and silylene radical containing up to 5 silicon atoms such as $SiMe_2$, $SiPh_2$; preferably L is a group $(Z(R'')_2)_n$ wherein Z is a carbon or a silicon atom, n is 1 or 2 and R" is a $C_1$-$C_{20}$ hydrocarbon radical optionally containing heteroatoms belonging to groups 13-17 of the Periodic Table of the Elements; preferably R" is a linear or branched, cyclic or acyclic, $C_1$-$C_{20}$-alkyl, $C_2$-$C_{20}$ alkenyl, $C_2$-$C_{20}$ alkynyl, $C_6$-$C_{20}$-aryl, $C_7$-$C_{20}$-alkylaryl or $C_7$-$C_{20}$-arylalkyl radicals optionally containing heteroatoms belonging to groups 13-17 of the Periodic Table of the Elements; more preferably the group $(Z(R'')_2)_n$ is $Si(CH_3)_2$, $SiPh_2$, SiPhMe, $SiMe(SiMe_3)$, $CH_2$, $(CH_2)_2$, and $C(CH_3)_2$;

$R^1$ and $R^2$, equal to or different from each other, are $C_1$-$C_{40}$ hydrocarbon radicals optionally containing heteroatoms belonging to groups 13-17 of the Periodic Table of the Elements; preferably they are linear or branched, cyclic or acyclic, $C_1$-$C_{40}$-alkyl, $C_2$-$C_{40}$ alkenyl, $C_2$-$C_{40}$ alkynyl, $C_6$-$C_{40}$-aryl, $C_7$-$C_{40}$-alkylaryl or $C_7$-$C_{40}$-arylalkyl radicals; optionally containing heteroatoms belonging to groups 13-17 of the Periodic Table of the Elements; more preferably $R^1$ and $R^2$ are linear, saturated or unsaturated $C_1$-$C_{20}$-alkyl radicals; more preferably $R^1$ and $R^2$ are methyl or ethyl radicals;

T, equal to or different from each other, is a moiety of formula (IIa), (IIb) or (IIc):

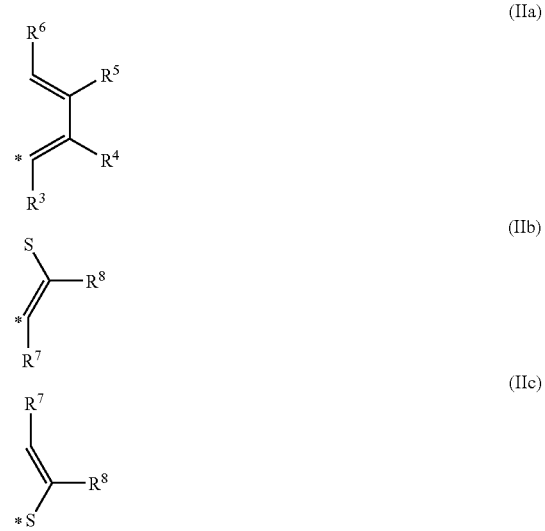

wherein the atom marked with the symbol * bonds the atom marked with the same symbol in the compound of formula (Ia);

$R^3$ is a $C_1$-$C_{40}$ hydrocarbon radical optionally containing heteroatoms belonging to groups 13-17 of the Periodic Table of the Elements; preferably $R^3$ is a linear or branched, cyclic or acyclic, $C_1$-$C_{40}$-alkyl, $C_2$-$C_{40}$ alkenyl, $C_2$-$C_{40}$ alkynyl, $C_6$-$C_{40}$-aryl, $C_7$-$C_{40}$-arylalkyl or a $C_7$-$C_{40}$-alkylaryl radical; optionally containing heteroatoms belonging to groups 13-17 of the Periodic Table of the Elements; more preferably $R^3$ is a linear or branched, $C_1$-$C_{20}$-alkyl $C_6$-$C_{40}$-aryl, $C_7$-$C_{40}$-arylalkyl radical; even more preferably $R^3$ is a $C_6$-$C_{20}$-aryl radical optionally substituted with one or more $C_1$-$C_{10}$ alkyl groups;

$R^4$ and $R^6$, equal to or different from each other, are hydrogen atoms or $C_1$-$C_{40}$ hydrocarbon radicals optionally containing heteroatoms belonging to groups 13-17 of the Periodic Table of the Elements; preferably $R^4$ and R[6], equal to or different from each other, are hydrogen atoms or linear or branched, cyclic or acyclic, $C_1$-$C_{40}$-alkyl, $C_2$-$C_{40}$ alkenyl, $C_2$-$C_{40}$ alkynyl, $C_6$-$C_{40}$-aryl, $C_7$-$C_{40}$-alkylaryl or $C_7$-$C_{40}$-arylalkyl radicals; optionally containing heteroatoms belonging to groups 13-17 of the Periodic Table of the Elements; preferably R[4] and R[6] are hydrogen atoms;

R[5] is a $C_1$-$C_{40}$ hydrocarbon radical optionally containing heteroatoms belonging to groups 13-17 of the Periodic Table of the Elements; preferably R[5] is a linear or branched, cyclic or acyclic, $C_1$-$C_{40}$-alkyl, $C_2$-$C_{40}$ alkenyl, $C_2$-$C_{40}$ alkynyl, $C_6$-$C_{40}$-aryl, $C_7$-$C_{40}$-alkylaryl or $C_7$-$C_{40}$-arylalkyl radicals; optionally containing heteroatoms belonging to groups 13-17 of the Periodic Table of the Elements; more preferably R[5] is a linear or branched, saturated or unsaturated $C_1$-$C_{20}$-alkyl radical; even more preferably R[5] is a methyl or ethyl radical;

R[7] and R[8], equal to or different from each other, are hydrogen atoms or $C_1$-$C_{40}$ hydrocarbon radicals optionally containing heteroatoms belonging to groups 13-17 of the Periodic Table of the Elements; preferably R[7] and R[8] are hydrogen atoms or linear or branched, cyclic or acyclic, $C_1$-$C_{40}$-alkyl, $C_2$-$C_{40}$ alkenyl, $C_2$-$C_{40}$ alkynyl, $C_6$-$C_{40}$-aryl, $C_7$-$C_{40}$-alkylaryl or $C_7$-$C_{40}$-arylalkyl radicals; optionally containing heteroatoms belonging to groups 13-17 of the Periodic Table of the Elements; preferably R[8] is a hydrogen atom or a linear or branched, saturated or unsaturated $C_1$-$C_{20}$-alkyl radical; more preferably R[8] is a methyl or ethyl radical; preferably R[7] is a hydrogen atom or a $C_1$-$C_{40}$-alkyl, $C_6$-$C_{40}$-aryl or a $C_7$-$C_{40}$-arylalkyl radical; more preferably R[7] is a group of formula (III)

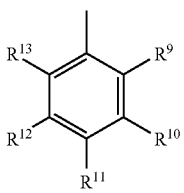

(III)

wherein R[9], R[10], R[11], R[12] and R[13], equal to or different from each other, are hydrogen atoms or linear or branched, cyclic or acyclic, $C_1$-$C_{20}$-alkyl, $C_2$-$C_{20}$ alkenyl, $C_2$-$C_{20}$ alkynyl, $C_6$-$C_{20}$-aryl, $C_7$-$C_{20}$-alkylaryl or $C_7$-$C_{20}$-arylalkyl radicals; optionally containing heteroatoms belonging to groups 13-17 of the Periodic Table of the Elements; preferably R[9], and R[12] are a hydrogen atoms; R[10], R[11] and R[13] are preferably hydrogen atoms or linear or branched, cyclic or acyclic, $C_1$-$C_{10}$-alkyl radicals;

b) an alumoxane or a compound capable of forming an alkyl metallocene cation; and optionally c) an organo aluminum compound.

This kind of process is described in EP 04101912.6 and PCT/EP2005/004506.

For the purpose of the present invention the term "meso form" means that the same substituents on the two cyclopentadienyl moieties are on the same side with respect to the plane containing the zirconium and the centre of the said cyclopentadienyl moieties. "Meso-like form" means that the bulkier substituents of the two cyclopentadienyl moieties on the metallocene compound are on the same side with respect to the plane containing the zirconium and the centre of the said cyclopentadienyl moieties as shown in the following compound:

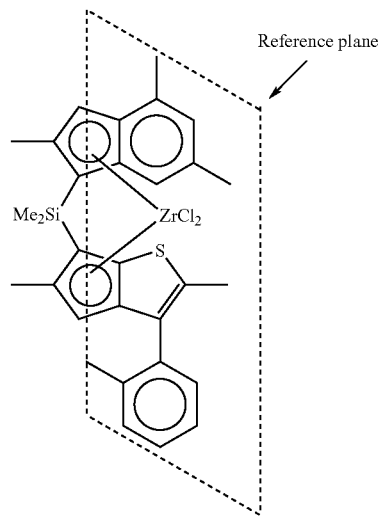

In the isotactic 1-butene/propylene copolymer (component b) the content of propylene derived units is preferably comprised between 1% by weight and 4% by weight, even more preferably it is comprised between 3% by weight and 3.5% by weight. Component b) has preferably isotactic pentads (mmmm) measured by $^{13}$C-NMR, higher than 85%; more preferably higher than 90%; even more preferably higher than 95%.

The melting point of component b) is comprised between 80° C. and 120° C. more preferably it is comprised between 90° C. and 105° C.

For the purpose of the present invention the melting point of the copolymer are always referred to form I or otherwise specified.

The intrinsic viscosity (IV) measured in tetrahydronaphtalene (THN) at 135° C. is comprised between 0.5 dl/g and 4.0 dl/g; preferably it is comprised between 1.0 dl/g and 3.0 dl/g, even more preferably the intrinsic viscosity (IV) is higher than 1.1 dl/g and lower than 2.5 dl/g.

The isotactic 1-butene-based polymer useful as component b) can be obtained by using single-site based catalyst system such as for example metallocene-based catalyst system.

The molecular weight distribution (Mw/Mn) of component b) is preferably lower than 3, more preferably lower than 2.5.

In one embodiment the intrinsic viscosity (IV) of the component a) is equal to or higher than 70%; preferably higher than 80% of the intrinsic viscosity of component b). This feature enhances the compatibility of the two components in the compositions of the present invention. With the 1-butene composition object of the present invention it is possible to soft the isotactic 1-butene-based polymers in a very efficient way so that to achieve a new material that can be used for several applications in order to replace, for example, polyvinylchloride, polyuretane or styrene block copolymers. Moreover since both component a) and b) are mainly based on 1-butene, the two polymers are completely miscible allowing to obtain a very intimate blend. Moreover the presence of the isotactic 1-butene polymer, even in very small quantities, has the advantage to make the resulting composition not sticky, even if it retains most of the properties of the atactic 1-butene polymers, in this way the processability of the composition is greatly improved.

Preferably in the 1-butene polymer composition, component a) ranges from 20% to 80% by weight and component b) ranges from 80% to 20% by weight; more preferably component a) ranges from 30% to 70% by weight and component b) ranges from 70% to 30% by weight.

The following compositions are also possible:

| component a) | component b) |
| --- | --- |
| 10-20% by weight | 90-80% by weight |
| 20-30% by weight | 80-70% by weight |
| 30-40% by weight | 70-60% by weight |
| 40-50% by weight | 60-50% by weight |
| 50-60% by weight | 50-40% by weight |
| 60-70% by weight | 40-30% by weight |
| 70-80% by weight | 30-20% by weight |
| 80-90% by weight | 20-10% by weight |

The 1-butene composition object of the present invention can be obtained either by mechanically mixing component a) and b) i.e for example by co-extruding together component a) and b), by mixing the solutions of component a) and component b) and then removing the solvent, or by solubilizing component b) in component a) heated so that to lower the viscosity; or by a reactor blend, i.e. in this case, the composition is produced directly in one or more reactors without the need of a mechanical blending.

In a particular embodiment, the 1-butene polymer composition object of the present invention can be obtained in one step by using one or more reactors and a mixture of two compatible catalyst systems one of them producing the atactic component a) and the other one producing the 1-butene-based polymer component b).

A single-site based catalyst system mainly comprises a transition metal organic compound, such as a metallocene compound, and a cocatalyst, usually alumoxanes or boron compounds. When both components a) and b) of the composition according to the present invention are obtained by using single-site based catalyst systems, it is possible to use two transition metal organic compounds, and one cocatalyst able to activate both the transition metal organic compounds. In this case one transition metal organic compound produces the component a) and the second transition metal organic compound produces the component b) and the same cocatalyst is used. For example, the transition metal compound described in U.S. Pat. No. 6,288,192 can be used together with the metallocene compound described in EP03101304.8 both being activated by alumoxanes or boron compounds.

For the purpose of the present invention, transition metal organic compounds are compounds able to give polymers having a narrow molecular weight distribution (Mw/Mn) i.e. a molecular weight distribution lower than 4; more preferably lower than 3 even more preferably lower than 2.5, being single-site catalyst components. Examples of such compounds are metallocene compounds or the transition metal compound described in U.S. Pat. No. 6,288,192.

In a preferred embodiment, in order to carry out the above described process, it is possible to use the racemic or racemic-like form and meso or meso-like form of a particular class of metallocene compounds. Therefore, a further object of the present invention is a process for producing a poly(1-butene composition) described above comprising the step of polymerizing 1-butene and propylene, in the presence of a catalyst system obtainable by contacting:

a) at least a metallocene compound of formula (Ia) in the meso or meso-like form

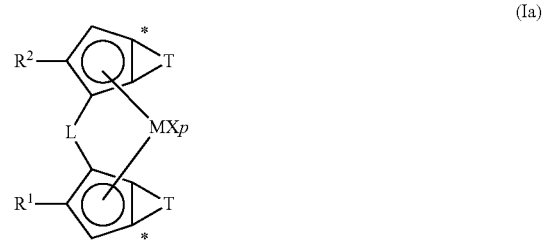

(Ia)

wherein

M is an atom of a transition metal selected from those belonging to group 3, 4, 5, 6 or to the lanthanide or actinide groups in the Periodic Table of the Elements; preferably M is titanium, zirconium or hafnium;

p is an integer from 0 to 3, preferably p is 2, being equal to the formal oxidation state of the metal M minus 2;

X, same or different, is a hydrogen atom, a halogen atom, or a R, OR, $OSO_2CF_3$, OCOR, SR, $NR_2$ or $PR_2$ group, wherein R is a linear or branched, cyclic or acyclic, $C_1$-$C_{40}$-alkyl, $C_2$-$C_{40}$ alkenyl, $C_2$-$C_{40}$ alkynyl, $C_6$-$C_{40}$-aryl, $C_7$-$C_{40}$-alkylaryl or $C_7$-$C_{40}$-arylalkyl radical; optionally containing heteroatoms belonging to groups 13-17 of the Periodic Table of the Elements; preferably R is a linear or branched $C_1$-$C_{20}$-alkyl radical; or two X can optionally form a substituted or unsubstituted butadienyl radical or a OR'O group wherein R' is a divalent radical selected from $C_1$-$C_{40}$ alkylidene, $C_6$-$C_{40}$ arylidene, $C_7$-$C_{40}$ alkylarylidene and $C_7$-$C_{40}$ arylalkylidene radicals; preferably X is a hydrogen atom, a halogen atom or a R group; more preferably X is chlorine or a $C_1$-$C_{10}$-alkyl radical; such as methyl, or ethyl radicals;

L is a divalent $C_1$-$C_{40}$ hydrocarbon radical optionally containing heteroatoms belonging to groups 13-17 of the Periodic Table of the Elements or a divalent silylidene radical containing up to 5 silicon atom; preferably L is a divalent bridging group selected from $C_1$-$C_{40}$ alkylidene, $C_3$-$C_{40}$ cycloalkylidene, $C_6$-$C_{40}$ arylidene, $C_7$-$C_{40}$ alkylarylidene, or $C_7$-$C_{40}$ arylalkylidene radicals optionally containing heteroatoms belonging to groups 13-17 of the Periodic Table of the Elements, and silylidene radical containing up to 5 silicon atoms such as $SiMe_2$, $SiPh_2$; preferably L is a group $(Z(R'')_2)_n$ wherein Z is a carbon or a silicon atom, n is 1 or 2 and R" is a $C_1$-$C_{20}$ hydrocarbon radical optionally containing heteroatoms belonging to groups 13-17 of the Periodic Table of the Elements; preferably R" is a linear or branched, cyclic or acyclic, $C_1$-$C_{20}$-alkyl, $C_2$-$C_{20}$ alkenyl, $C_2$-$C_{20}$ alkynyl, $C_6$-$C_{20}$-aryl, $C_7$-$C_{20}$-alkylaryl or $C_7$-$C_{20}$-arylalkyl radicals optionally containing heteroatoms belonging to groups 13-17 of the Periodic Table of the Elements; more preferably the group $(Z(R'')_2)_n$ is $Si(CH_3)_2$, $SiPh_2$, SiPhMe, $SiMe(SiMe_3)$, $CH_2$, $(CH_2)_2$, and $C(CH_3)_2$;

$R^1$ and $R^2$, equal to or different from each other, are $C_1$-$C_{40}$ hydrocarbon radicals optionally containing heteroatoms belonging to groups 13-17 of the Periodic Table of the Elements; preferably they are linear or branched, cyclic or acyclic, $C_1$-$C_{40}$-alkyl, $C_2$-$C_{40}$ alkenyl, $C_2$-$C_{40}$ alkynyl, $C_6$-$C_{40}$-aryl, $C_7$-$C_{40}$-alkylaryl or $C_7$-$C_{40}$-arylalkyl radicals; optionally containing heteroatoms belonging to groups 13-17 of the Periodic Table of the Elements; more preferably $R^1$ and $R^2$ are linear or branched, saturated or unsaturated $C_1$-$C_{20}$-alkyl radicals; more preferably $R^1$ and $R^2$ are methyl or ethyl radicals;

T, equal to or different from each other, is a moiety of formula (IIa), (IIb) or (IIc):

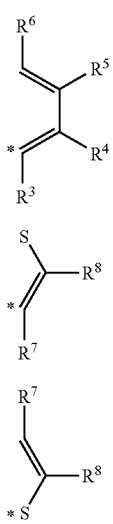

wherein the atom marked with the symbol * bonds the atom marked with the same symbol in the compound of formula (Ia);

$R^3$ is a $C_1$-$C_{40}$ hydrocarbon radical optionally containing heteroatoms belonging to groups 13-17 of the Periodic Table of the Elements; preferably $R^3$ is a linear or branched, cyclic or acyclic, $C_1$-$C_{40}$-alkyl, $C_2$-$C_{40}$ alkenyl, $C_2$-$C_{40}$ alkynyl, $C_6$-$C_{40}$-aryl, $C_7$-$C_{40}$-arylalkyl or a $C_7$-$C_{40}$-alkylaryl radical; optionally containing heteroatoms belonging to groups 13-17 of the Periodic Table of the Elements; more preferably $R^3$ is a linear or branched, $C_1$-$C_{20}$-alkyl $C_6$-$C_{40}$-aryl, $C_7$-$C_{40}$-arylalkyl radical; even more preferably $R^3$ is a $C_6$-$C_{20}$-aryl radical optionally substituted with one or more $C_1$-$C_{10}$ alkyl groups;

$R^4$ and $R^6$, equal to or different from each other, are hydrogen atoms or $C_1$-$C_{40}$ hydrocarbon radicals optionally containing heteroatoms belonging to groups 13-17 of the Periodic Table of the Elements; preferably $R^4$ and $R^6$, equal to or different from each other, are hydrogen atoms or linear or branched, cyclic or acyclic, $C_1$-$C_{40}$-alkyl, $C_2$-$C_{40}$ alkenyl, $C_2$-$C_{40}$ alkynyl, $C_6$-$C_{40}$-aryl, $C_7$-$C_{40}$-alkylaryl or $C_7$-$C_{40}$-arylalkyl radicals; optionally containing heteroatoms belonging to groups 13-17 of the Periodic Table of the Elements; preferably $R^4$ and $R^6$ are hydrogen atoms;

$R^5$ is a $C_1$-$C_{40}$ hydrocarbon radical optionally containing heteroatoms belonging to groups 13-17 of the Periodic Table of the Elements; preferably $R^5$ is a linear or branched, cyclic or acyclic, $C_1$-$C_{40}$-alkyl, $C_2$-$C_{40}$ alkenyl, $C_2$-$C_{40}$ alkynyl, $C_6$-$C_{40}$-aryl, $C_7$-$C_{40}$-alkylaryl or $C_7$-$C_{40}$-arylalkyl radicals; optionally containing heteroatoms belonging to groups 13-17 of the Periodic Table of the Elements; more preferably $R^5$ is a linear or branched, saturated or unsaturated $C_1$-$C_{20}$-alkyl radical; even more preferably $R^5$ is a methyl or ethyl radical;

$R^7$ and $R^8$, equal to or different from each other, are hydrogen atoms or $C_1$-$C_{40}$ hydrocarbon radicals optionally containing heteroatoms belonging to groups 13-17 of the Periodic Table of the Elements; preferably $R^7$ and $R^8$ are hydrogen atoms or linear or branched, cyclic or acyclic, $C_1$-$C_{40}$-alkyl, $C_2$-$C_{40}$ alkenyl, $C_2$-$C_{40}$ alkynyl, $C_6$-$C_{40}$-aryl, $C_7$-$C_{40}$-alkylaryl or $C_7$-$C_{40}$-arylalkyl radicals; optionally containing heteroatoms belonging to groups 13-17 of the Periodic Table of the Elements;

preferably $R^8$ is a hydrogen atom or a linear or branched, saturated or unsaturated $C_1$-$C_{20}$-alkyl radical; more preferably $R^8$ is a methyl or ethyl radical; preferably $R^7$ is a $C_1$-$C_{40}$-alkyl, $C_6$-$C_{40}$-aryl or a $C_7$-$C_{40}$-arylalkyl; more preferably $R^7$ is a group of formula (III)

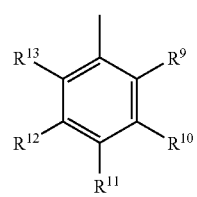

wherein $R^9$, $R^{10}$, $R^{11}$, $R^{12}$ and $R^{13}$, equal to or different from each other, are hydrogen atoms or linear or branched, cyclic or acyclic, $C_1$-$C_{20}$-alkyl, $C_2$-$C_{20}$ alkenyl, $C_2$-$C_{20}$ alkynyl, $C_6$-$C_{20}$-aryl, $C_7$-$C_{20}$-alkylaryl or $C_7$-$C_{20}$-arylalkyl radicals; optionally containing heteroatoms belonging to groups 13-17 of the Periodic Table of the Elements; preferably $R^9$, and $R^{12}$ are a hydrogen atoms; $R^{10}$, $R^{11}$ and $R^{13}$ are preferably hydrogen atoms or linear or branched, cyclic or acyclic, $C_1$-$C_{10}$-alkyl radicals;

b) at least a metallocene compound of formula (Ib) in the racemic (rac) or racemic-like form

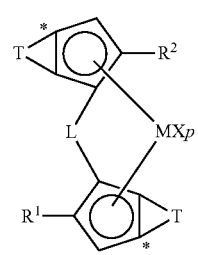

wherein $R^1$, $R^2$, T, L, M, X and p have been described above; and wherein $R^1$, $R^2$, T, L, M, X and p have been described above; and wherein the atoms marked with the symbol * bonds the atom marked with the same symbol in the moieties of formula (IIa), (IIb) or (IIc)

c) an alumoxane or a compound capable of forming an alkyl metallocene cation; and optionally d) an organo aluminum compound.

Preferably the ratio between the racemic or the racemic like form and the meso form or the meso-like form ranges from 10:90 to 90:10; more preferably from 20:80 to 80:20; even more preferably from 30:70 to 70:30.

In one embodiment the compounds of formulas (Ia) and (Ib) have respectively the following formulas (IVa) or (IVb)

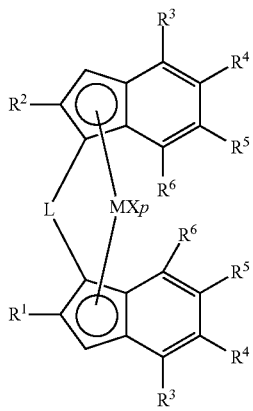
(IVa)

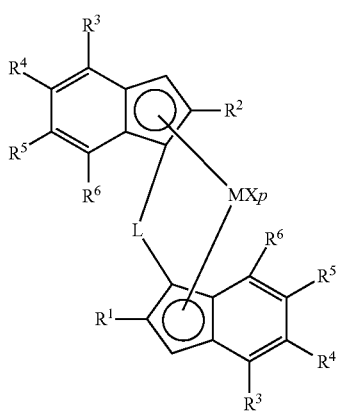
(IVb)

wherein
M, X, p, L, R¹, R², R³, R⁴, R⁵ and R⁶ have the above described meaning.

In an alternative embodiment the compounds of formulas (Ia) and (Ib) have respectively the following formulas (Va) or (Vb)

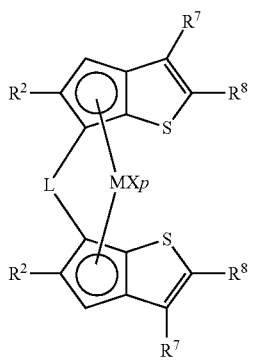
(Va)

-continued

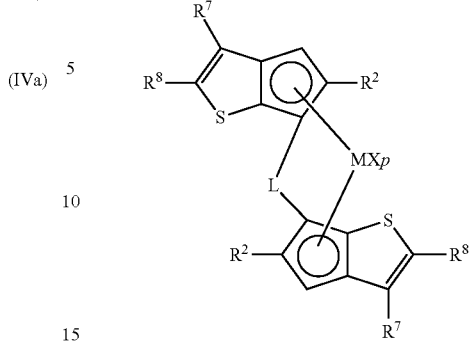
(Vb)

wherein M, X, p, L, R', R², R⁷ and R⁸ have the above described meaning.

Metallocene compounds of formula (Ia) and (Ib) are well known in the art, they can be prepared according to known procedure, such as those described in WO 01/44318, WO 03/045964, PCT/EP02/13552 and DE 10324541.3.

What it is meant for meso or meso like form is explained above. For the purpose of the present invention the term "racemic form" means that the same substituents on the two cyclopentadienyl moieties are on the opposite side with respect to the plane containing the zirconium and the centre of the said cyclopentadienyl moieties. "Racemic-like form" means that the bulkier substituents of the two cyclopentadienyl moieties on the metallocene compound are on the opposite side with respect to the plane containing the zirconium and the centre of the said cyclopentadienyl moieties as shown in the following compound:

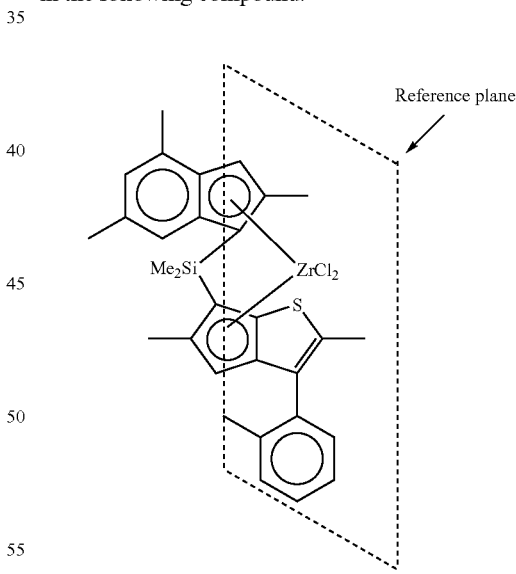

With said process it is possible to obtain the poly(1-butene) composition object of the present invention in an easy and economic way and in high yields. In fact the metallocene compounds having $C_2$ symmetry such as the metallocene compound of formula (Ia) are usually obtained from the synthesis in a mixture of racemic and meso form, the meso form is usually inactive or it produces polymer having very low molecular weight. The applicant has surprisingly found that the meso form of the compound of formula (Ia) gives atactic high molecular weight poly(1-butene) in high yield. Therefore it is possible to use the racemic and meso mixture of the metallocene compound as such without the need of further purification in order to separate the two isomeric forms for achieving the composition object of the present invention. Moreover by regulating the racemic/meso ratio of the metallocene compound of formula (Ia) it is possible to achieve poly(1-butene) compositions having different amounts of component a) or b).

Preferably in said process the metallocene compound of formula (Ia) and the metallocene compound of formula (Ib) have the same structure being different only for the spatial configuration (racemic or racemic-like and meso or meso-like). In this way the further advantage that it is possible to achieve is that the molecular weight distribution (Mw/Mn) of the 1-butene polymer composition obtained is lower than 3.5; preferably lower than 3; even more preferably lower than 2.5.

Alumoxanes used as component b) or c) in the above processes can be obtained by reacting water with an organo-aluminium compound of formula $H_jAlU_{3-j}$ or $H_jAl_2U_{6-j}$, where the U substituents, same or different, are hydrogen atoms, halogen atoms, $C_1$-$C_{20}$-alkyl, $C_3$-$C_{20}$-cycloalkyl, $C_6$-$C_{20}$-aryl, $C_7$-$C_{20}$-alkylaryl or $C_7$-$C_{20}$-arylalkyl radicals, optionally containing silicon or germanium atoms, with the proviso that at least one U is different from halogen, and j ranges from 0 to 1, being also a non-integer number. In this reaction the molar ratio of Al/water is preferably comprised between 1:1 and 100:1.

The alumoxanes used in the process according to the invention are considered to be linear, branched or cyclic compounds containing at least one group of the type:

wherein the substituents U, same or different, are defined above.

In particular, alumoxanes of the formula:

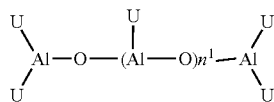

can be used in the case of linear compounds, wherein $n^1$ is 0 or an integer from 1 to 40 and the substituents U are defined as above; or alumoxanes of the formula:

can be used in the case of cyclic compounds, wherein $n^2$ is an integer from 2 to 40 and the U substituents are defined as above.

Examples of alumoxanes suitable for use according to the present invention are methylalumoxane (MAO), tetra-(isobutyl)alumoxane (TIBAO), tetra-(2,4,4-trimethyl-pentyl)alumoxane (TIOAO), tetra-(2,3-dimethylbutyl)alumoxane (TDMBAO) and tetra-(2,3,3-trimethylbutyl)alumoxane (TTMBAO).

Particularly interesting cocatalysts are those described in WO 99/21899 and in WO01/21674 in which the alkyl and aryl groups have specific branched patterns.

Non-limiting examples of aluminium compounds that can be reacted with water to give suitable alumoxanes (b), described in WO 99/21899 and WO01/21674, are: tris(2,3,3-trimethyl-butyl)aluminium, tris(2,3-dimethyl-hexyl)aluminium, tris(2,3-dimethyl-butyl)aluminium, tris(2,3-dimethyl-pentyl)aluminium, tris(2,3-dimethyl-heptyl)aluminium, tris(2-methyl-3-ethyl-pentyl)aluminium, tris(2-methyl-3-ethyl-hexyl)aluminium, tris(2-methyl-3-ethyl-heptyl)aluminium, tris(2-methyl-3-propyl-hexyl)aluminium, tris(2-ethyl-3-methyl-butyl)aluminium, tris(2-ethyl-3-methyl-pentyl)aluminium, tris(2,3-diethyl-pentyl)aluminium, tris(2-propyl-3-methyl-butyl)aluminium, tris(2-isopropyl-3-methyl-butyl)aluminium, tris(2-isobutyl-3-methyl-pentyl)aluminium, tris(2,3,3-trimethyl-pentyl)aluminium, tris(2,3,3-trimethyl-hexyl)aluminium, tris(2-ethyl-3,3-dimethyl-butyl)aluminium, tris(2-ethyl-3,3-dimethyl-pentyl)aluminium, tris(2-isopropyl-3,3-dimethyl-butyl)aluminium, tris(2-trimethylsilyl-propyl)aluminium, tris(2-methyl-3-phenyl-butyl)aluminium, tris(2-ethyl-3-phenyl-butyl)aluminium, tris(2,3-dimethyl-3-phenyl-butyl)aluminium, tris(2-phenyl-propyl)aluminium, tris[2-(4-fluoro-phenyl)-propyl]aluminium, tris[2-(4-chloro-phenyl)-propyl]aluminium, tris[2-(3-isopropyl-phenyl)-propyl]aluminium, tris(2-phenyl-butyl)aluminium, tris(3-methyl-2-phenyl-butyl)aluminium, tris(2-phenyl-pentyl)aluminium, tris[2-(pentafluorophenyl)-propyl]aluminium, tris[2,2-diphenyl-ethyl]aluminium and tris[2-phenyl-2-methyl-propyl]aluminium, as well as the corresponding compounds wherein one of the hydrocarbyl groups is replaced with a hydrogen atom, and those wherein one or two of the hydrocarbyl groups are replaced with an isobutyl group.

Among the above aluminium compounds, trimethylaluminium (TMA), triisobutylaluminium (TIBA), tris(2,4,4-trimethyl-pentyl)aluminium (TIOA), tris(2,3-dimethylbutyl) aluminium (TDMBA) and tris(2,3,3-trimethylbutyl) aluminium (TTMBA) are preferred.

Non-limiting examples of compounds able to form an alkylmetallocene cation are compounds of formula $D^+E^-$, wherein $D^+$ is a Brønsted acid, able to donate a proton and to react irreversibly with a substituent X of the metallocene of formulas (Ia) and (Ib) and $E^-$ is a compatible anion, which is able to stabilize the active catalytic species originating from the reaction of the two compounds, and which is sufficiently labile to be removed by an olefinic monomer. Preferably, the anion $E^-$ comprises one or more boron atoms. More preferably, the anion $E^-$ is an anion of the formula $BAr_4^{(-)}$, wherein the substituents Ar which can be identical or different are aryl radicals such as phenyl, pentafluorophenyl or bis(trifluoromethyl)phenyl. Tetrakis-pentafluorophenyl borate is particularly preferred compound, as described in WO 91/02012. Moreover, compounds of formula $BAr_3$ can be conveniently used. Compounds of this type are described, for example, in the International patent application WO 92/00333. Other examples of compounds able to form an alkylmetallocene cation are compounds of formula $BAr_3P$ wherein P is a substituted or unsubstituted pyrrol radical. These compounds are described in WO01/62764. Compounds containing boron atoms can be conveniently supported according to the description of DE-A-19962814 and DE-A-19962910. All these compounds containing boron atoms can be used in a molar ratio between boron and the metal of the metallocene comprised between about 1:1 and about 10:1; preferably 1:1 and 2.1; more preferably about 1:1.

Non limiting examples of compounds of formula $D^+E^-$ are:
Triethylammoniumtetra(phenyl)borate,
Tributylammoniumtetra(phenyl)borate,
Trimethylammoniumtetra(tolyl)borate, Tributylammoniumtetra(tolyl)borate,
Tributylammoniumtetra(pentafluorophenyl)borate,
Tributylammoniumtetra(pentafluorophenyl)aluminate,
Tripropylammoniumtetra(dimethylphenyl)borate,
Tributylammoniumtetra(trifluoromethylphenyl)borate,
Tributylammoniumtetra(4-fluorophenyl)borate,
N,N-Dimethylbenzylammonium-tetrakispentafluorophenylborate,
N,N-Dimethylhexylamonium-tetrakispentafluorophenylborate,
N,N-Dimethylaniliniumtetra(phenyl)borate,
N,N-Diethylaniliniumtetra(phenyl)borate,
N,N-Dimethylaniliniumtetrakis(pentafluorophenyl)borate,
N,N-Dimethylaniliniumtetrakis(pentafluorophenyl)aluminate,
N,N-Dimethylbenzylammonium-tetrakispentafluorophenylborate,
N,N-Dimethylhexylamonium-tetrakispentafluorophenylborate,
Di(propyl)ammoniumtetrakis(pentafluorophenyl)borate,
Di(cyclohexyl)ammoniumtetrakis(pentafluorophenyl)borate,
Triphenylphosphoniumtetrakis(phenyl)borate,
Triethylphosphoniumtetrakis(phenyl)borate,
Diphenylphosphoniumtetrakis(phenyl)borate,
Tri(methylphenyl)phosphoniumtetrakis(phenyl)borate,
Tri(dimethylphenyl)phosphoniumtetrakis(phenyl)borate,
Triphenylcarbeniumtetrakis(pentafluorophenyl)borate,
Triphenylcarbeniumtetrakis(pentafluorophenyl)aluminate,
Triphenylcarbeniumtetrakis(phenyl)aluminate,
Ferroceniumtetrakis(pentafluorophenyl)borate,
Ferroceniumtetrakis(pentafluorophenyl)aluminate.
Triphenylcarbeniumtetrakis(pentafluorophenyl)borate, and
N,N-Dimethylaniliniumtetrakis(pentafluorophenyl)borate.

Organic aluminum compounds used as compound c) or d) are those of formula $H_jAlU_{3-j}$ or $H_jAl_2U_{6-j}$ as described above.

The polymerization process of the present invention can be carried out in liquid phase, optionally in the presence of an inert hydrocarbon solvent. Said hydrocarbon solvent can be either aromatic (such as toluene) or aliphatic (such as propane, hexane, heptane, isobutane, cyclohexane, isododecane and 2,2,4-trimethylpentane). Preferably, the polymerization process of the present invention is carried out by using liquid 1-butene and propylene mixture as polymerization medium.

The polymerization temperature preferably ranges from 0° C. to 250° C.; preferably comprised between 20° C. and 150° C. and, more particularly preferably between 40° C. and 90° C. Even more preferably between 60° C. and 80° C.

The intrinsic viscosity (I.V.) was measured in tetrahydronaphtalene (THN) at 135° C. If indicated that it was measured in decahydronaphtalene, the conversion between the intrinsic viscosity measured in tetrahydronapthalene and intrinsic viscosity measured in decahydronaphtalene (DHN) has been carried out according to the following empirical equation

IV(THN)=0.871V(DHN)

This equation has been derived by analyzing the IV measured in THN and DHN of several polybutene samples.

The melting points of the polymers ($T_m$) were measured by Differential Scanning calorimetry (D.S.C.) on a Perkin Elmer DSC-7 instrument, according to the standard method. A weighted sample (5-7 mg) obtained from the polymerization was sealed into aluminum pans and heated to 180° C. at 10° C./minute. The sample was kept at 180° C. for 5 minutes to allow a complete melting of all the crystallites, then cooled to 20° C. at 10° C./minute. After standing 2 minutes at 20° C., the sample was heated for the second time to 180° C. at 10° C./min. In this second heating run, the peak temperature was taken as the melting temperature ($T_m$) and the area of the peak as melting enthalpy ($\Delta H_f$).

In order to measure the amount of Form I and Form II the following procedure has been used.

A sample of the polymer obtained from the polymerization was heated to 180° C. at 10° C./minute. The sample was kept at 180° C. for 5 minutes to allow a complete melting of all the crystallites, then cooled to 20° C. at 10° C./minute. Subsequently, at different times, a small amount of this sample (5-7 mg) was heated to 180° C. at 10° C./min by Differential Scanning calorimetry (D.S.C.) on a Perkin Elmer DSC-7 instrument. In this heating run, the peaks temperature was taken as the melting temperature ($T_m$). The lower melting point is taken as the melting point of the form II, while the higher melting point is taken as the melting point of form I. The areas of the two peaks have been considered as directly proportional to the melting enthalpies of Form II and Form I, respectively. The percentage of the area of the peak belonging to form I (higher melting point) has been considered as the percentage of the crystalline polymer present in the form I.

Molecular weight parameters and molecular weight distribution for all the samples were measured using a Waters 150C ALC/GPC instrument (Waters, Milford, Mass., USA) equipped with four mixed-gel columns PLgel 20 μm Mixed-A LS (Polymer Laboratories, Church Stretton, United Kingdom). The dimensions of the columns were 300×7.8 mm. The solvent used was TCB and the flow rate was kept at 1.0 mL/min. Solution concentrations were 0.1 g/dL in 1,2,4 trichlorobenzene (TCB). 0.1 g/L of 2,6-di-t-butyl-4-methyl phenol (BHT) was added to prevent degradation and the injection volume was 300 μL. All the measurements were carried out at 135° C. GPC calibration is complex, as no well-characterized narrow molecular weight distribution standard reference materials are available for 1-butene polymers. Thus, a universal calibration curve was obtained using 12 polystyrene standard samples with molecular weights ranging from 580 to 13,200,000. It was assumed that the K values of the Mark-Houwink relationship were: $K_{PS}=1.21\times 10^{-4}$, dL/g and $K_{PB}=1.78\times 10^{-4}$ dL/g for polystyrene and poly-1-butene respectively. The Mark-Houwink exponents a were assumed to be 0.706 for polystyrene and 0.725 for poly-1-butene. Even though, in this approach, the molecular parameters obtained were only an estimate of the hydrodynamic volume of each chain, they allowed a relative comparison to be made.

$^{13}$C-NMR spectra were acquired on a DPX-400 spectrometer operating at 100.61 MHz in the Fourier transform mode at 120° C. The samples were dissolved in 1,1,2,2-tetrachloroethane-d2 at 120° C. with a 8% wt/v concentration. Each spectrum was acquired with a 90° pulse, 15 seconds of delay between pulses and CPD (waltz16) to remove $^1H$-$^{13}C$ coupling. About 3000 transients were stored in 32K data points using a spectral window of 6000 Hz. The isotacticity of the copolymers is measured by $^{13}$C NMR, and is defined as the relative intensity of the mmmm triad peak of the diagnostic methylene of the ethyl branch. This peak at 27.73 ppm was used as internal reference. Pentad assignments are given according to *Macromolecules*, 1992, 25, 6814-6817. The assignments of the butene/propylene copolymers and the evaluation of composition were made according to 1) H. N. Cheng, Journal of Polymer Science, Polymer Physics Edition, 21, 573 (1983)

The composition was calculated as follow using the Sαα carbons.

$PP=S\alpha\alpha(47.15-46.52\text{ ppm})/\Sigma$ $BP=S\alpha\alpha(43.67-43.27\text{ ppm})/\Sigma$ $BB=S\alpha\alpha(40.23\text{ ppm})/\Sigma$ Where $\Sigma=\Sigma S\alpha\alpha$ The total amount of 1 butene and propylene as molar percent is calculated from diads using the following relations:

$[P]=PP+0.5BP$ $[B]=BB+0.5BP$

Owing to the overlap between sequences due to stereoerrors and comonomer sequences in copolymers with C3(m %) up to 50, the stereoregularity of the B centred triads (PBP BBP and BBB) as mm content, was evaluated using the areas A and B where:
A: form 28.4 to 27.45 ppm represents the XBX mm triads
B: from 27.45 to 26.4 ppm represents the XBX mr+rr triads (where X can be either B or P)

Therefore the content of isotactic fraction is obtained as follows:

$XBX\ mm = 100*A/(A+B)$.

Infrared crystallinity was determined from the infrared absorption spectrum of about 1 mm thin film of the polymer by using the absorptions A at 1221 cm$^{-1}$ and 1151 cm$^{-1}$ in the equation:

$$\text{crystallinity} = \frac{\left(\frac{A_{1221}}{A_{1151}}\right)_{solid} - 0.76}{5.43 - 0.76}$$

The equation is described in Chem. of High Polymers (Japan) 19, 667 (1962) by Nishioka and Yanagisawa.

The xylene solubles at 0° C. was measured according to the following procedure:
A sample of 2.5 g of the reactor composition prepared above was suspended in 250 ml of xylene previously distilled. The mixture was heated so as to reach the temperature of 135° C. in about 30 minutes while gently stirring under a light nitrogen flow. Once the temperature of 135° C. has been reached, to complete the sample dissolution, the mixture has been kept at 135° for another 30 minutes.

Once the dissolution step has been concluded, the solution was air-cooled under stirring till it reaches a temperature of about 100° C. The flask containing the solution was then placed in a Dewar vessel with a water and ice bath, so that the temperature inside the flask falls to 0° C. The solution is kept at 0° C. under stirring for 1 hour, so as to complete the crystallisation[1] of the insoluble.

The obtained mixture was filtered through a short stem glass funnel and a quick filtering paper filter. If the filtrate is not completely limpid, the filtration is repeated. During the filtration step, the mixture is kept at 0° C. Once the filtration is finished, the filtrate has been balanced at 25° C., and then two 50-ml aliquots have been placed into two volumetric flasks.

One of the two 50-ml filtrate aliquots has been transferred into a previously calibrated aluminium pan (The aluminium pans are to be kept in a muffle furnace at 500° C. for 30 minutes before usage). The aluminium pan has been heated to 140° C. so to evaporate the solvent under a light nitrogen flow and, at the same time, collect and condense the evaporated solvent vapours. Once the solvent evaporation is completed, the pan has been placed in a vacuum (200-400 mbar) oven at 75-80° C. and under nitrogen flow so as to dry the content till constant weight (total soluble). This procedure has been repeated for the 50-ml second aliquot of filtrate.

In parallel an aliquot of 50 ml of xylene was subjected to the same evaporation procedure in order to have a blank reference.

The soluble fraction in o-xylene at 0° C. (total soluble) is expressed as a weight percentage with the following general formula:

$$XS\ \% = \frac{\left(\left(\frac{M_{r_1}+M_{r_2}}{2}\right) - \left(M_b \times \left(\frac{V_r}{V_b}\right)\right)\right) \times V_i}{M_i \times V_r} \times 100 \quad (1)$$

where the symbols stand for the following:
XS %=weight percentage of the total soluble fraction;
$M_{r_1}$=first aliquot residue on evaporation;
$M_{r_2}$=second aliquot residue on evaporation;
$M_b$=blank residue on evaporation;
$M_i$=starting sample weight;
$V_r$=evaporated solution volume;
$V_b$=evaporated blank volume;
$V_i$=starting solvent volume.

The insoluble fraction in o-xylene at 0° C. (total soluble) is expressed as weight percentage with the following general formula:

$XI\%=100-XS\%$ (2)

where the symbols stand for the following:
XI %=insoluble fraction weight percentage;
XS %=total soluble weight percentage.

FIG. 1 shows a qualitative percentage of Form (I) vs. time for some samples of the composition prepared according to examples 1 and 2 according to the invention and comparative example 3.

Figure 2:
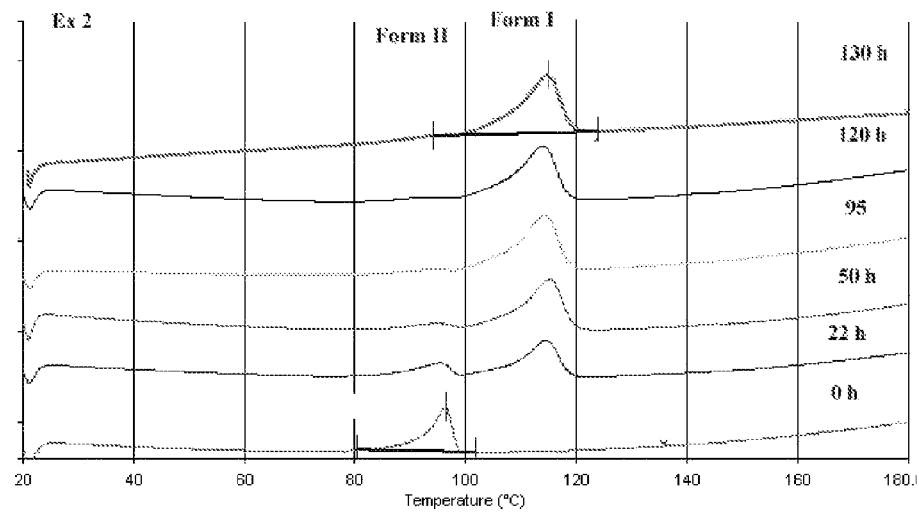

FIG. 2 shows the qualitative thermograms of the polymer of example 2 at various times.

The following examples are given for illustrative purpose and do not intend to limit the present invention.

EXAMPLES

The intrinsic viscosity (I.V.) was measured in tetrahydronaphtalene (THN) at 135° C. The conversion between the intrinsic viscosity measured in tetrahydronapthalene and intrinsic viscosity measured in decahydronaphtalene (DHN) has been carried out according to the following empirical equation $IV(THN)=0.87IV(DHN)$ This equation has been derived by analyzing the IV measured in THN and DHN of several polybutene samples.

The melting points of the polymers ($T_m$) were measured by Differential Scanning calorimetry (D.S.C.) on a Perkin Elmer DSC-7 instrument, according to the standard method. A weighted sample (5-7 mg) obtained from the polymerization was sealed into aluminum pans and heated to 180° C. at 10° C./minute. The sample was kept at 180° C. for 5 minutes to allow a complete melting of all the crystallites, then cooled to 20° C. at 10° C./minute. After standing 2 minutes at 20° C., the sample was heated for the second time to 180° C. at 10° C./min. In order to measure the amount of Form I and Form II the following procedure has been used.

A sample of the polymer obtained from the polymerization was heated to 180° C. at 10° C./minute. The sample was kept at 180° C. for 5 minutes to allow a complete melting of all the crystallites, then cooled to 20° C. at 10° C./minute. Subsequently, at different times, a small amount of this sample (5-7 mg) was heated to 180° C. at 10° C./min by Differential Scanning calorimetry (D.S.C.) on a Perkin Elmer DSC-7 instrument. In this heating run, the peaks temperature was taken as the melting temperature ($T_m$). The lower melting point is taken as the melting point of the form II, while the higher melting point is taken as the melting point of form I. The areas of the two peaks have been considered as directly proportional to the melting enthalpies of Form II and Form I, respectively. The percentage of the area of the peak belonging to form I (higher melting point) has been considered as the percentage of the crystalline polymer present in the form I. Molecular weight parameters and molecular weight distribution for all the samples were measured using a Waters 150C ALC/GPC instrument (Waters, Milford, Mass., USA) equipped with four mixed-gel columns PLgel 20 μm Mixed-A LS (Polymer Laboratories, Church Stretton, United Kingdom). The dimensions of the columns were 300×7.8 mm. The solvent used was TCB and the flow rate was kept at 1.0 mL/min. Solution concentrations were 0.1 g/dL in 1,2,4 trichlorobenzene (TCB). 0.1 g/L of 2,6-di-t-butyl-4-methyl phenol (BHT) was added to prevent degradation and the injection volume was 300 μL. All the measurements were carried out at 135° C. GPC calibration is complex, as no well-characterized narrow molecular weight distribution standard reference materials are available for 1-butene polymers. Thus, a universal calibration curve was obtained using 12 polystyrene standard samples with molecular weights ranging from 580 to 13,200,000. It was assumed that the K values of the Mark-Houwink relationship were: $K_{PS}=1.21\times 10^{-4}$, dL/g and $K_{PB}=1.78\times 10^{-4}$ dL/g for polystyrene and poly-1-butene respectively. The Mark-Houwink exponents a were assumed to be 0.706 for polystyrene and 0.725 for poly-1-butene. Even though, in this approach, the molecular parameters obtained were only an estimate of the hydrodynamic volume of each chain, they allowed a relative comparison to be made.

$^{13}$C-NMR spectra were acquired on a DPX-400 spectrometer operating at 100.61 MHz in the Fourier transform mode at 120° C. The samples were dissolved in 1,1,2,2-tetrachloroethane-d2 at 120° C. with a 8% wt/v concentration. Each spectrum was acquired with a 90° pulse, 15 seconds of delay between pulses and CPD (waltz16) to remove $^1$H-$^{13}$C coupling. About 3000 transients were stored in 32K data points using a spectral window of 6000 Hz. The isotacticity of the copolymers is measured by $^{13}$C NMR, and is defined as the relative intensity of the mmmm triad peak of the diagnostic methylene of the ethyl branch. This peak at 27.73 ppm was used as internal reference. Pentad assignments are given according to *Macromolecules*, 1992, 25, 6814-6817. The assignments of the butene/propylene copolymers and the evaluation of composition were made according to 1) H. N. Cheng, Journal of Polymer Science, Polymer Physics Edition, 21, 573 (1983)

The composition was calculated as follow using the $S\alpha\alpha$ carbons.

$$PP=S\alpha\alpha(47.15\text{-}46.52 \text{ ppm})/\Sigma$$

$$BP=S\alpha\alpha(43.67\text{-}43.27 \text{ ppm})/\Sigma$$

$$BB=S\alpha\alpha(40.23 \text{ ppm})/\Sigma$$

Where $\Sigma=\Sigma S\alpha\alpha$

The total amount of 1 butene and propylene as molar percent is calculated from diads using the following relations:

$$[P]=PP+0.5BP$$

$$[B]=BB+0.5BP$$

Owing to the overlap between sequences due to stereoerrors and comonomer sequences (FIG. 1), in copolymers with C3(m %) up to 50, the stereoregularity of the B centred triads (PBP BBP and BBB) as mm content, was evaluated using the areas A and B where:
A: form 28.4 to 27.45 ppm represents the XBX mm triads
B: from 27.45 to 26.4 ppm represents the XBX mr+rr triads
(where X can be either B or P)
Therefore the content of isotactic fraction is obtained as follows:

$$XBX\ mm=100*A/(A+B).$$

Infrared Crystallinity

Infrared crystallinity was determined from the infrared absorption spectrum of about 1 mm thin film of the polymer by using the absorptions A at 1221 cm$^{-1}$ and 1151 cm$^{-1}$ in the equation:

$$\text{crystallinity}=\frac{\left(\frac{A_{1221}}{A_{1151}}\right)_{solid}-0.76}{5.43-0.76}$$

The equation is described in Chem. of High Polymers (Japan) 19, 667 (1962) by Nishioka and Yanagisawa.

Xylene Solubles at 0° C.

A sample of 2.5 g of the reactor composition prepared above was suspended in 250 ml of xylene previously distilled. The mixture was heated so as to reach the temperature of 135° C. in about 30 minutes while gently stirring under a light nitrogen flow. Once the temperature of 135° C. has been reached, to complete the sample dissolution, the mixture has been kept at 135° for another 30 minutes.

Once the dissolution step has been concluded, the solution was air-cooled under stirring till it reaches a temperature of about 100° C. The flask containing the solution was then placed in a Dewar vessel with a water and ice bath, so that the temperature inside the flask falls to 0° C. The solution is kept at 0° C. under stirring for 1 hour, so as to complete the crystallisation$^1$ of the insoluble.

The obtained mixture was filtered through a short stem glass funnel and a quick filtering paper filter. If the filtrate is not completely limpid, the filtration is repeated. During the filtration step, the mixture is kept at 0° C. Once the filtration is finished, the filtrate has been balanced at 25° C., and then two 50-ml aliquots have been placed into two volumetric flasks.

One of the two 50-ml filtrate aliquots has been transferred into a previously calibrated aluminium pan (The aluminium pans are to be kept in a muffle furnace at 500° C. for 30 minutes before usage). The aluminium pan has been heated to 140° C. so to evaporate the solvent under a light nitrogen flow and, at the same time, collect and condense the evaporated solvent vapours. Once the solvent evaporation is completed, the pan has been placed in a
vacuum (200-400 mbar) oven at 75-80° C. and under nitrogen flow so as to dry the content till constant weight (total soluble). This procedure has been repeated for the 50-ml second aliquot of filtrate.

In parallel an aliquot of 50 ml of xylene was subjected to the same evaporation procedure in order to have a blank reference.

The soluble fraction in o-xylene at 0° C. (total soluble) is expressed as a weight percentage with the following general formula:

$$XS\% = \frac{\left(\left(\frac{M_{r_1} + M_{r_2}}{2}\right) - \left(M_b \times \left(\frac{V_r}{V_b}\right)\right)\right) \times V_i}{M_i \times V_r} \times 100 \quad (1)$$

where the symbols stand for the following:
XS %=weight percentage of the total soluble fraction;
$M_{r_1}$=first aliquot residue on evaporation;
$M_{r_2}$=second aliquot residue on evaporation;
$M_b$=blank residue on evaporation;
$M_i$=starting sample weight;
$V_r$=evaporated solution volume;
$V_b$=evaporated blank volume;
$V_i$=starting solvent volume.

The insoluble fraction in o-xylene at 0° C. (total soluble) is expressed as weight percentage with the following general formula:

$$X\% = 100 - XS\% \quad (2)$$

where the symbols stand for the following:
XI %=insoluble fraction weight percentage;
XS %=total soluble weight percentage.

Preparation of Components a) General Procedure meso dimethylsilandiylbis-6-[2,5-dimethyl-3-(2'-methyl-phenyl)cyclopentadienyl-[1,2-b]-thiophene]zirconium dichloride (A-1) was prepared according to WO 01/44318. Rac dimethylsilandiylbis-6-[2,5-dimethyl-3-(2'-methyl-phenyl)cyclopentadienyl-[1,2-b]-thiophene]zirconium dichloride (A-2) was prepared according to WO01/44318.

Catalyst System

A 101 g/L solution of TIBA in isododecane was mixed a 30% wt/wt toluene solution of Methylalumoxane (MAO) in order to reach MAO/TIBA, molar ratio 2:1. This solution was then added to a mixture of A-1 and A-2 (60/40). The resulting catalytic solution contains 3.21% wt of A-1+A-2 and 24.7% wt of Al.

1-Butene Polymerization

The polymerization was carried out in a pilot plant comprising two stirred reactors connected in series in which liquid butene-1 and propylene constituted the liquid medium. The catalyst system reported in table 1 was injected into the reactor at a feed rate of 8-10 g/h and the polymerization was carried out in continuous at a polymerization temperature of 65° C., while 1-butene and propylene were feed according to the data reported on table 1. The pressure of the two reactors was kept constant at 24 bar-g. Two runs have been carried out. The 1-butene polymer was recovered as melt from the solution and cut in pellets. The polymerization conditions are reported in table 1.

TABLE 1

| | Run | | | |
|---|---|---|---|---|
| | 1 | | 2 | |
| | 1-1 First reactor | 1-2 Second reactor | 2-1 First reactor | 2-2 Second reactor |
| Residence time (min) | 125 | 77 | 177 | 110 |
| C4-feed (kg/h) | 100 | 55 | 70 | 40 |
| C3-feed (kg/h) | 4.2 | 1.5 | 1.3 | 0.38 |
| Yield kg/g§ | 4.2 | | 4.2 | |

§yield referred to Kg polymer/g catalyst system
C4 = 1-butene
C3 = propylene

Some instantaneous samples of copolymer coming from the first or the second reactor of runs 1 and 2 were collected and analyzed after about 10 days of annealing according to ISO 527-1 and ISO 178. The data are reported in table 2.

TABLE 2

| | | Run | |
|---|---|---|---|
| | | 1 | 2 |
| From run | | 1 | 2 |
| MEF (ISO) aged 10 min in autoclave STRESS AT BREAK | MPa | 31 | 33 |
| spec. type S2 aged 10 min in autoclave ELONGATION AT BREAK | MPa | 12.3 | 18.2 |
| spec. type S2 aged 10 min in autoclave COMPRESSION SET 25%, 22 h | % | 435 | 583 |
| at 70° C. aged 240 h | % | 68 | 49 |
| at 70° C. aged 10 min in autoclave | % | 40 | 38 |
| SHORE A aged 10 min in autoclave | — | 87 | 86.8 |
| Propylene content (nmr) | % wt | 1.2 | 3.2 |
| Mw/Mn | | 2.4 | 2.4 |

The samples 1-2 were fractionated in xylene at 0° C. in order to separate the isotactic fraction from the atactic fraction. The separate fractions were analyzed. The results are reported in tables 3 and

TABLE 3

| | Split % wt | I.V. | C3 % wt | Mw/Mn | infrared crystallinity % | enthalpy of fusion J/g | mmmm % | Tm(II) ° C. |
|---|---|---|---|---|---|---|---|---|
| Ex 1 | | | | | | | | |
| Atactic fraction | 49.2 | 1.4 | 1.2 | <2.5 | <0.05 | n.d. | 21-29 (rr). | n.d. |
| Isotactic fraction | 50.8 | 1.4 | 1.2 | <2.5 | n.m. | 15.2 J/g | >90 | 104.3 |

TABLE 3-continued

| | Split % wt | I.V. | C3 % wt | Mw/Mn | infrared crystallinity % | enthalpy of fusion J/g | mmmm % | Tm(II) °C. |
|---|---|---|---|---|---|---|---|---|
| Ex 2 | | | | | | | | |
| Atactic fraction | 45.2 | 1.4 | 3.2 | <2.5 | <0.05 | n.d. | 21-29 (rr). | n.d. |
| Isotactic fraction | 54.8 | 1.4 | 3.2 | <2.5 | n.m. | 15.7 | >90 | 96.4 | infrared crystallinity % has been measured on the fraction soluble in xylene at 0° C.
n.d. = not detectable
n.m. = not measured
Tm(II) = melting point form II Compression moulded plaques of the polymers of examples 1-2 have been obtained. The DSC analyses on samples of these plaques have been carried out at various times in order to detect the percentage of form I formed. The results are reported in table 5 compared with the results of the same analysis carried out on samples of the composition 6 described in EP04103525.4. They have been plotted in FIG. 1.

TABLE 4

| Samples | Time (h) | % form I | C3 (% wt.) | XS (% wt.) |
|---|---|---|---|---|
| Ex 1 | 0 | 0 | 1.2 | 49.2 |
| | 20 | 7.6 | | |
| | 29 | 14.8 | | |
| | 47 | 36.7 | | |
| | 90 | 51.8 | | |
| | 144 | 65.6 | | |
| | 200 | 75.0 | | |
| Ex 2 | 0 | 0 | 3.2 | 45.2 |
| | 22 | 57.8 | | |
| | 50 | 79.2 | | |
| | 95 | 87.4 | | |
| | 120 | 89.3 | | |
| | 130 | 100 | | |
| Comp Ex 3 | 0 | 0 | 0 | |
| | 22 | 8.7 | | |
| | 74 | 31.4 | | |
| | 168 | 50.1 | | |
| | 360 | 65.4 | | |

The invention claimed is:

1. A 1-butene/propylene copolymer composition comprising a content of propylene derived units from 1 to 4% by weight,
   a) from 5% by weight to 95% by weight of an atactic 1-butene propylene copolymer comprising:
      i) a distribution of molecular weight Mw/Mn equal to or lower than 4;
      ii) rr triads, measured by $^{13}$C-NMR, between 10% and 40%;
      iii) no enthalpy of fusion detectable at a differential scanning calorimeter (DSC); and
      iv) an infrared crystallinity lower than 0.5%; and
   b) from 5% by weight to 95% by weight of an isotactic 1-butene propylene comprising:
      i) isotactic pentads (mmmm), measured by $^{13}$C-NMR, higher than 80%;
      ii) a melting point (Tm(II) form II) higher than 70° C.; and
      iii) a distribution of molecular weight Mw/Mn equal to or lower than 4,
      the copolymer composition having a crystalline polymer fraction wherein at least 50% of the crystalline polymer is present in a thermodynamically stable, trigonal Form I (detected by DSC analysis) after 100 hours of a first melting at room temperature.

2. The 1-butene/propylene copolymer composition according to claim 1, wherein component a) further comprises an intrinsic viscosity (IV), measured in tetrahydronaphtalene (THN) at 135° C., ranging from 1.0 dl/g and 5.0 dl/g.

3. The 1-butene/propylene copolymer composition according to claim 1, wherein the isotactic pentads (mmmm), measured by $^{13}$C-NMR, for component b) is higher than 85%.

4. The 1-butene/propylene copolymer composition according to claim 1, wherein the propylene derived units ranges from 1 to 3.5% by weight.

5. The 1-butene/propylene copolymer composition according to claim 1, wherein the melting point of component b) ranges from 80° C. and 120° C.

6. The 1-butene/propylene copolymer composition according to claim 1, wherein component b) further comprises an intrinsic viscosity (IV), measured in tetrahydronaphtalene (THN) at 135° C., ranging from 1.0 dl/g and 3.0 dl/g.

7. The 1-butene/propylene copolymer composition according to claim 1, wherein the intrinsic viscosity (IV) of component a) is equal to or higher than 70% of the intrinsic viscosity of component b).

8. The 1-butene/propylene copolymer composition according to claim 1, wherein at least 50% of the copolymer is present in trigonal Form I after 75 hours annealing at room temperature.

9. A process for producing a 1-butene/propylene copolymer composition comprising a content of propylene derived units from 1 to 4% by weight,
   a) from 5% by weight to 95% by weight of an atactic 1-butene propylene copolymer comprising:
      i) a distribution of molecular weight Mw/Mn equal to or lower than 4;
      ii) rr triads, measured by $^{13}$C-NMR, between 10% and 40%;
      iii) no enthalpy of fusion detectable at a differential scanning calorimeter (DSC); and
      iv) an infrared crystallinity lower than 0.5%; and
   b) from 5% by weight to 95% by weight of an isotactic 1-butene propylene comprising:
      i) isotactic pentads (mmmm), measured by $^{13}$C-NMR, higher than 80%;
      ii) a melting point (Tm(II) form II) higher than 70° C.; and iii) a distribution of molecular weight Mw/Mn equal to or lower than 4;

the copolymer composition having a crystalline polymer fraction wherein at least 50% of the crystalline polymer is present in a thermodynamically stable, trigonal Form I (detected by DSC analysis) after 100 hours of a first melting at room temperature, the process comprising polymerizing 1-butene and propylene in the presence of a catalyst system obtained by contacting:

a) at least one metallocene compound of formula (Ia) in a meso or meso-like form:

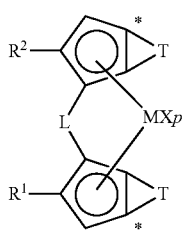
(Ia)

wherein

M is an atom of a transition metal selected from those belonging to group 3, 4, 5, 6 or to the lanthanide or actinide groups in the Periodic Table of Elements;

p is an integer from 0 to 3, and is equal to a formal oxidation state of M minus 2;

X, same or different, is hydrogen, a halogen, or R, OR, $OSO_2CF_3$, OCOR, SR, $NR_2$, or $PR_2$ group, or two X can optionally form a substituted or unsubstituted butadienyl radical or a OR'O group;

R is a linear or branched, cyclic or acyclic $C_1$-$C_{40}$-alkyl, $C_2$-$C_{40}$ alkenyl, $C_2$-$C_{40}$ alkynyl, $C_6$-$C_{40}$-aryl, $C_7$-$C_{40}$-alkylaryl, or $C_7$-$C_{40}$-arylalkyl radical, optionally comprising at least one heteroatom belonging to groups 13-17 of the Periodic Table of Elements;

R' is a divalent radical selected from $C_1$-$C_{40}$ alkylidene, $C_6$-$C_{40}$ arylidene, $C_7$-$C_{40}$ alkylarylidene, and $C_7$-$C_{40}$ arylalkylidene radicals;

L is a divalent $C_1$-$C_{40}$ hydrocarbon radical optionally comprising at least one heteroatom belonging to groups 13-17 of the Periodic Table of Elements, or is a divalent silylene radical comprising up to 5 silicon atoms;

$R^1$ and $R^2$, equal to or different from each other, are $C_1$-$C_{40}$ hydrocarbon radicals, optionally comprising at least one heteroatom belonging to groups 13-17 of the Periodic Table of Elements;

T, equal to or different from each other, is a moiety of formula (IIa), (IIb) or (IIc):

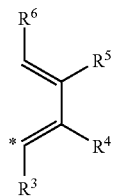
(IIa)

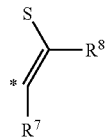
(IIb)

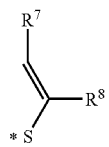
(IIc)

wherein the atom marked with the symbol * bonds to the atom marked with the same symbol in the compound of formula (Ia);

$R^3$ is a $C_1$-$C_{40}$ hydrocarbon radical optionally comprising at least one heteroatom belonging to groups 13-17 of the Periodic Table of Elements;

$R^4$ and $R^6$, equal to or different from each other, are hydrogen or $C_1$-$C_{40}$ hydrocarbon radicals, optionally comprising at least one heteroatom belonging to groups 13-17 of the Periodic Table of Elements;

$R^5$ is a $C_1$-$C_{40}$ hydrocarbon radical optionally comprising at least one heteroatom belonging to groups 13-17 of the Periodic Table of Elements; and $R^7$ and $R^8$, equal to or different from each other, are hydrogen or $C_1$-$C_{40}$ hydrocarbon radicals, optionally comprising at least one heteroatom belonging to groups 13-17 of the Periodic Table of Elements;

b) at least a metallocene compound of formula (Ib) in a racemic (rac) or racemic-like form

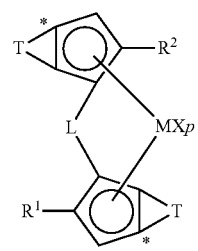
(Ib)

wherein R', $R^2$, T, L, M, X and p have been described above; and wherein the atoms marked with the symbol * bonds to the atom marked with the same symbol in the moieties of formula (IIa), (IIb) or (IIc); and c) an alumoxane or a compound capable of forming an alkyl metallocene cation.

10. The process according to claim 9, wherein a ratio between the racemic or the racemic like form of the compound of formula (Ib) and the meso form or the meso-like form of the compound of formula (Ia) ranges from 10:90 to 90:10.

11. The process according to claim 9, wherein the compounds of formulas (Ia) and (Ib) have the following formulas (Va) or (Vb), respectively,

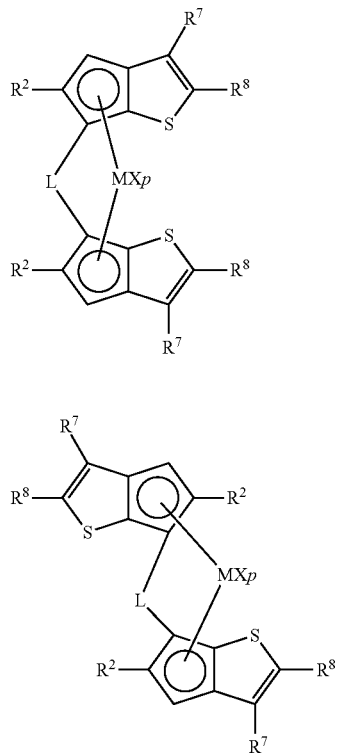

wherein

M is an atom of a transition metal selected from those belonging to group 3, 4, 5, 6 or to the lanthanide or actinide groups in the Periodic Table of Elements;

p is an integer from 0 to 3, and is equal to a formal oxidation state of M minus 2;

X, same or different, is hydrogen, a halogen, or R, OR, $OSO_2CF_3$, OCOR, SR, $NR_2$, or $PR_2$ group, or two X can optionally form a substituted or unsubstituted butadienyl radical or a OR'O group;

R is a linear or branched, cyclic or acyclic $C_1$-$C_{40}$-alkyl, $C_2$-$C_{40}$ alkenyl, $C_2$-$C_{40}$ alkynyl, $C_6$-$C_{40}$-aryl, $C_7$-$C_{40}$-alkylaryl, or $C_7$-$C_{40}$-arylalkyl radical, optionally comprising at least one heteroatom belonging to groups 13-17 of the Periodic Table of Elements;

R' is a divalent radical selected from $C_1$-$C_{40}$ alkylidene, $C_6$-$C_{40}$ arylidene, $C_7$-$C_{40}$ alkylarylidene, and $C_7$-$C_{40}$ arylalkylidene radicals;

L is a divalent $C_1$-$C_{40}$ hydrocarbon radical optionally comprising at least one heteroatom belonging to groups 13-17 of the Periodic Table of Elements, or is a divalent silylene radical comprising up to 5 silicon atoms;

$R^1$ and $R^2$, equal to or different from each other, are $C_1$-$C_{40}$ hydrocarbon radicals, optionally comprising at least one heteroatom belonging to groups 13-17 of the Periodic Table of Elements; and $R^7$ and $R^8$, equal to or different from each other, are hydrogen or $C_1$-$C_{40}$ hydrocarbon radicals, optionally comprising at least one heteroatom belonging to groups 13-17 of the Periodic Table of Elements.

* * * * *